United States Patent Office 3,238,110
Patented Mar. 1, 1966

3,238,110
METHOD FOR PRODUCING 5-AMINO-4-IMIDAZOLECARBOXAMIDE RIBOSIDE
Teruo Shiro and Shimpachi Konishi, Kanagawa-ken, Akio Yamanoi, Suginami-ku, Tokyo, Shinji Okumura, Kanagawa-ken, and Masahiro Takahashi, Bunkyo-ku, Tokyo, Japan, assignors to Ajinomoto Co., Inc., Tokyo, Japan
No Drawing. Filed July 10, 1963, Ser. No. 294,140
Claims priority, application Japan, July 18, 1962, 37/29,614; May 17, 1963, 38/24,447
8 Claims. (Cl. 195—28)

This invention relates to a method for producing 5-amino-4-imidazolecarboxamide riboside (5-amino-1-β-D-ribosyl-4-imidazolecarboxamide, AICAR), and more particularly to a method for producing AICAR by bacterial fermentation in aerobic conditions.

AICAR is one of the biologically important precursors of purine nucleoside, and the compond is expected to find increasing use in the fields of medicine and biochemistry. AICAR is the best known raw material for the synthesis of 5-amino-4-imidazolecarboxamide ribotide (5-amino-1-β-D-ribosyl-4-imidazolecarboxamide 5′-phosphate, AICA-ribotide).

Known methods of producing AICAR employ 5-amino-4-imidazolecarboxamide (AICA) as a starting material. The latter is synthesized chemically or biochemically and subjected to addition of ribose in a sequence of steps which is complex and costly.

This invention is based on the discovery that certain artificially induced biochemical mutants of Bacillus subtilis and Bacillus megaterium can produce and accumulate AICAR extracellularly in a culture medium from assimilable carbon and nitrogen sources under aerobic conditions in concentrations as high as one to nine grams per liter. The AICAR is recovered from the medium after the microorganism have been cultured thereon for a sufficient period. It was found that in an aerobic culture medium of ordinary bacteria of various stock cultures and newly isolated cultures from nature which may grow on a nutrient agar slant the extracellular production of AICAR was negligible. The production of AICAR in the aerobically fermentative culture of the artificially induced biochemical mutants of bacteria of our process was therefore surprising. The process lends itself to the production of AICAR on an industrial scale.

The microorganisms utilized in our process can produce and accumulate AICAR extracellularly in an aerobic culture medium and can grow on a nutrient agar slant. They are characterized by requiring at least one of the purine bases such as adenine, guanine, hypoxanthine and xanthine for their growth.

The method of obtaining the artificially induced biochemical mutants of bacteria utilized for our process will be described with reference to Becillus subtilis and Bacillus megaterium as typical bacteria. Bacillus subtilis and Bacillus megaterium are not normally capable of producing a significant amount of AICAR nor of accumulating an appreciable amount thereof in a culture medium. When these microorganisms were exposed to unltraviolet light, X-rays or gamma radiation, or when they were placed in contact with a solution of sodium nitrite either in the form of active cells or as spores, the biochemical mutants, which have the capacity of producing extracellularly AICAR in an aerobic culture medium and require at least one of the purine bases adenine, guanine, hypoxanthine and xanthine for growth, were induced. They were selected from the unchanged strain by conventional screening techniques and by making use of the fact that the mutants are auxotrophic. (cf. Werner Brown: Bacterial Genetics, W. B. Saunders Company (1953)). The parent strains are normally capable of growth on a conventional Gray-Tatum medium of the type exemplified in Table I, but the mutants do not grow on such a medium.

TABLE I.—GRAY-TATUM MEDIUM

| | | |
|---|---|---|
| Ammonium chloride | g | 5.0 |
| Ammonium nitrate | g | 1.0 |
| Sodium sulfate | g | 2.0 |
| Magnesium sulfate | g | 0.1 |
| Dipotassium hydrogen phosphate | g | 3.0 |
| Potassium dihydrogen phosphate | g | 1.0 |
| Calcium chloride | mg | 1.0 |
| Zinc sulfate | mg | 8.8 |
| Ferric chloride | mg | 0.9 |
| Copper sulfate | mg | 0.4 |
| Manganese chloride | mg | 0.07 |
| Glucose | g | 0.5 |

Water, to make one liter.

The mutants grow actively on a modified culture medium of the type exemplified by the medium listed in Table II which also supports growth of the parent strains. The rate of AICAR formation in the culture medium and the maximum concentration of AICAR reached was determined, and the strains best capable of producing and accumulating AICAR were selected.

TABLE II.—SCREENING MEDIUM FOR AICAR PRODUCTION

| | Percent |
|---|---|
| Glucose | 5.0 |
| Potassium dihydrogen phosphate | 0.2 |
| Magnesium sulfate heptahydrate | 0.04 |
| Ferrous sulfate | 0.0005 |
| Manganese sulfate | 0.0005 |
| Yeast extract | 0.5 |
| Ammonium chloride | 0.4 |
| Urea | 0.6 |
| Peptone | 0.5 | pH 7.0.

Known methods were employed for determining the AICAR concentration in the fermentation media. Paper chromatography, filter paper electrophoresis, the orcinol reaction for ribose, and the Bratton and Marshall method for estimation of AICAR were found most convenient for separating the several components in the media analyzed. The isolated crystals of AICAR were identified by conventional tests, such as ultraviolet absorption spectrum, infrared spectrum, melting point, $R_f$ value of paper chromatography, migration of filter paper electrophoresis, elementary analysis, the Bratton and Marshall method, the orcinol reaction, etc.

It is characteristic of many artificially induced biochemical mutants capable of producing and accumulating AICAR that they require at least one of the purine bases in their culture medium, and that they can be grown on Gray-Tatum medium modified to contain the necessary purine bases or corresponding derivatives, such as adenosine, guanosine, inosine, xanthosine, adenylic acid, guanylic acid, inosinic acid and xanthylic acid.

Typical artificial mutants of the afore-mentioned microorganisms which produce and accumulate AICAR in a culture medium are the Strain D–2511 (ATCC No. 15116) and D-422 (ATCC No. 15115) induced from Bacillus subtilis. The strain D–422 is characterized by its adenine, adenosine or adenylic acid requirement for growth, whereas the strain D–2511 require non-exacting purine bases, nucleosides or nucleotides.

Artificially induced mutants of Bacillus megaterium capable of producing AICAR in economically useful amounts include the strain MA–336 (ATCC No. 15117) and MA–658 (ATCC No. 15118). These mutant strains are capable of growing on a Gray-Tatum medium containing one of the purine bases, nucleosides or nucleotides.

The medium on which the mutant strains of the invention are cultured must contain sources of carbon and nitrogen, and the usual nutrients required by the microorganisms.

Suitable sources of assimilable carbon are carbohydrates, such as starch, starch hydrolysates, sugars, and industrial products rich in sugars, and metabolic carbon compounds such as sugar alcohols and organic acids. Table III shows the variations in the AICAR produced when the various carbon sources are added. The AICAR values in grams per liter were obtained with *B. subtilis* D–2511 and *B. megaterium* MA–336 under aerobic conditions (20 ml. medium in a 500 ml. shaking flask) at 31.5° C. for 72 hours.

TABLE III

| Carbon source added, 5% | B. subtilis D-2511 | B. megaterium D-336 |
|---|---|---|
| Glucose | 3.18 | 6.51 |
| Fructose | 1.25 | 5.63 |
| Maltose | 1.64 | 6.33 |
| Sucrose | 0.97 | 4.95 |
| Molasses | 2.56 | 5.71 |
| Starch | 2.45 | 6.12 |
| Starch hydrolysate | 3.43 | 6.94 |

BASAL MEDIUM (pH 7.0)

| | Percent |
|---|---|
| Potassium dihydrogen phosphate | 0.5 |
| Magnesium sulfate heptahydrate | 0.04 |
| Ferrous sulfate | 0.0005 |
| Manganese sulfate | 0.0005 |
| Ammonium chloride | 1.5 |
| Ammonium nitrate | 0.2 |
| Urea | 0.3 |
| Casein hydrolysate | 0.2 |
| Calcium carbonate | 5.0 |
| Ribonucleic acid | 0.125 |

The source of assimilable nitrogen may be an ammonium salt, a nitrate, urea, and ammonia supplied as an aqueous solution of gaseous ammonia admixed to the air of aeration in a known manner. The nitrogen of proteins or amino acids also is assimilated by the microorganisms.

Certain inorganic salts are necessary for the fermentation. They should form phosphate, sulfate, potassium, sodium, magnesium, ferrous or ferric, and manganous ions.

The more complex organic materials which enhance the growth of the microorganisms and accelerate the production of AICAR are important for making the process economically possible. Their presence affects the AICAR yield, the maximum AICAR concentration in the medium, and the rate of AICAR production. The nutrients or growth accelerating agents of this group include adenine, guanine, hypoxanthine, xanthine, adenosine, guanosine, inosine, xanthosine, adenylic acid, guanylic acid, inosinic acid, xanthylic acid, amino acids, various vitamins, and materials which contain these materials or are transformed into them under fermentation conditions.

Substances which contain the aforementioned materials are used, too. They are ribonucleic acid obtained from animal, plant and microorganism, protein hydrolysate, corn steep liquor, extracts obtained from microorganisms, and dry cells of microorganisms. The effects of the additions of nutrients and growth accelerating agents are shown in Table IV and Table V. The AICAR values in grams per liter were obtained with *B. subtilis* D–2511 and D–422 and *B. megaterium* D–336 under aerobic conditions (20 ml. medium in a 500 ml. shaking flask) at 31° C. for 64 hours (Table IV) and 60 hours (Table V).

TABLE IV

| Mg., percent | D-2511 | | | | D-422 Adenine | MA-336 Adenine |
|---|---|---|---|---|---|---|
| | Adenine | Guanine | Hypo-xanthine | Xanthine | | |
| 0 | 0 | 0 | 0 | 0 | 0 | 0 |
| 5 | 1.16 | 0.59 | 0.90 | 0 | 0.31 | 4.04 |
| 10 | 1.24 | 0.95 | 0.93 | 0.28 | 0.41 | 5.08 |
| 15 | 1.55 | 1.16 | 1.29 | 0.39 | 0.77 | 4.87 |
| 20 | 1.88 | 1.34 | 1.81 | 0.98 | 0.90 | 4.51 |
| 30 | 1.73 | 1.75 | 0.98 | 1.19 | 0.95 | 2.00 |
| 50 | 1.03 | 1.55 | 0.23 | 1.52 | 0.90 | 0.93 |
| 80 | 0.23 | 0.26 | 0.18 | 0.44 | 0.28 | 0.45 |

BASAL MEDIUM

*Bacillus subtilis* D–2511 and D–422:

| | Percent |
|---|---|
| Glucose | 5.0 |
| Potassium dihydrogen phosphate | 0.5 |
| Magnesium sulfate heptahydrate | 0.04 |
| Ferrous chloride | 0.0004 |
| Manganese chloride | 0.0004 |
| Ammonium chloride | 1.5 |
| Casein hydrolysate | 0.2 |
| Calcium carbonate | 5.0 |

*Bacillus megaterium* MA–336:

| | |
|---|---|
| Glucose | 6 |
| Potassium dihydrogen phosphate | 0.1 |
| Magnesium sulfate heptahydrate | 0.04 |
| Ferrous chloride | 0.0004 |
| Manganese chloride | 0.0004 |
| Ammonium chloride | 1.5 |
| Ammonium nitrate | 0.4 |
| Diammonium hydrogen phosphate | 0.05 |
| Urea | 0.15 |
| Casein hydrolysate | 0.2 |
| Calcium carbonate | 5 |

TABLE V

| G./100 ml. | Bacillus subtilis D-2511 | | |
|---|---|---|---|
| | Dry yeast | Yeast extract | Ribonucleic acid |
| 0.1 | 0.15 | 0.39 | 2.15 |
| 0.3 | 0.52 | 0.65 | 1.52 |
| 0.6 | 0.67 | 1.08 | 0.77 |
| 1.0 | 0.77 | 0.95 | 0.54 |
| 1.5 | 0.62 | 0.31 | 0.19 |

BASAL MEDIUM

| | Percent |
|---|---|
| Glucose | 5 |
| Potassium dihydrogen phosphate | 0.5 |
| Magnesium sulfate heptahydrate | 0.04 |
| Ferrous chloride | 0.0004 |
| Manganese chloride | 0.0004 |
| Ammonium chloride | 1.5 |
| Calcium carbonate | 5 |

The hydrogen ion concentration in the fermentation medium affects the AICAR yield. Good results were obtained between pH values of 5.0 and 8.5, and a narrower optimum range is determined for each mutant strain and specific culture conditions. The influence of pH on AICAR production in culture of *B. subtilis* D–2511 and *B. megaterium* MA–336 is illustrated by Table VI which lists results obtained with cultures for 68 hours at 31.5° C. Three liters of the medium were contained in a 5 liter jar fermenter, and were agitated by a stirrer running at 400 r.p.m., while air was passed through the medium at the rate of 750 ml. per minute. The indicated pH values were obtained by additions of phosphoric acid, hydrochloric acid, ammonia, $CaCO_3$, KOH, NaOH. To the cultures of *B. megaterium* D–336, ammonia solution and gaseous ammonia were added as neutralizing agent and nitrogen source.

TABLE VI

| pH | D-2511 | MA-336 |
|---|---|---|
| 4.6-4.8 | 0.38 | 0.82 |
| 5.0-5.3 | 1.75 | 3.63 |
| 5.8-6.1 | 2.14 | 7.82 |
| 6.7-7.0 | 1.88 | 7.51 |
| 7.5-7.8 | 1.52 | 6.74 |
| 8.2-8.5 | 0.97 | 2.44 |
| 8.6-8.9 | 0.45 | 0.87 |

MEDIUM

*Bacillus subtilis* D-2511: Percent
- Glucose _____ 6.0
- Potassium dihydrogen phosphate _____ 0.3
- Magnesium sulfate heptahydrate _____ 0.04
- Ferrous sulfate _____ 0.0005
- Manganese sulfate _____ 0.0005
- Ammonium chloride _____ 1.5
- Dry yeast _____ 1.0
- Casein hydrolysate _____ 0.2

*Bacillus megaterium* MA-336:
- Starch hydrolysate (as glucose) _____ 6.0
- Potassium dihydrogen phosphate _____ 0.1
- Magnesium sulfate heptahydrate _____ 0.04
- Ferrous sulfate _____ 0.0005
- Manganese sulfate _____ 0.0005
- Ammonium chloride _____ 0.3
- Urea _____ 0.15
- Ribonucleic acid _____ 0.125
- Soy bean meal _____ 0.3

Useful results are usually obtained in a temperature range between 25° C. and 40° C. and preferably between 30° C. and 37° C. The influence of the temperature on the AICAR yield obtained with two representative mutant strains of the invention is shown in Table VII. The AICAR concentration values listed were obtained in 20 ml. of medium cultured under shaking in a 500 ml. flask for 68 hours.

TABLE VII

| Temperature, ° C. | D-2511 | MA-336 |
|---|---|---|
| 25 | 1.01 | 3.36 |
| 30 | 1.98 | 6.34 |
| 34 | 2.04 | 7.21 |
| 37 | 1.67 | 5.84 |
| 40 | 0.64 | 1.15 |

MEDIUM

*Bacillus subtilis* D-2511: Percent
- Glucose _____ 6.0
- Potassium dihydrogen phosphate _____ 0.3
- Magnesium sulfate heptahydrate _____ 0.04
- Ferrous sulfate _____ 0.0005
- Manganese sulfate _____ 0.0005
- Ammonium chloride _____ 1.5
- Dry yeast _____ 1.0
- Casein hydrolysate _____ 0.2
- Calcium carbonate _____ 5.0

*Bacillus megaterium* MA-336:
- Starch hydrolysate (as glucose) _____ 6.0
- Potassium dihydrogen phosphate _____ 0.1
- Magnesium sulfate heptahydrate _____ 0.04
- Ferrous sulfate _____ 0.0005
- Manganese sulfate _____ 0.0005
- Ammonium chloride _____ 1.5
- Ammonium nitrate _____ 0.4
- Urea _____ 0.15
- Ribonucleic acid _____ 0.125
- Peptone _____ 0.2

The mutant strains of the invention are cultured under aerobic conditions, and air is admixed to the medium either by shaking or by aeration and agitation. The most favorable fermentation period is normally between two days and four days. Seed cultures are prepared on bouillon-agar media, on liquid bouillon, or on one of the fermentation media.

When a good mutant strain is cultured on a suitable fermentation medium under optimum conditions, the ultimate concentration of AICAR in the medium may be raised to 9 grams per liter. The AICAR is recovered from the medium by selective adsorption on activated charcoal, and on ion exchange resins, and AICAR in purified form is readily desorbed by eluants.

The following examples are further illustrative of this invention, but it will be understood that the invention is not limited thereto.

*Example 1*

An aqueous culture medium was prepared having the following composition in grams per deciliter:

- Glucose _____ 6.0
- Potassium dihydrogen phosphate _____ 0.8
- Magnesium sulfate heptahydrate _____ 0.04
- Ferrous chloride _____ 0.0004
- Manganese chloride _____ 0.0004
- Casein hydrolysate _____ 0.6
- Dry yeast _____ 1.0
- Ammonium chloride _____ 0.4
- Urea _____ 0.6
- Corn steep liquor _____ml__ 0.1
- Calcium carbonate _____ 2.0

Its pH was adjusted to 7.0.

Twenty ml. batches of the aqueous solution obtained were sterilized in 500 ml. flasks at 115° C. for 10 minutes. The medium in each flask was inoculated with 0.1 ml. of a suspension of the *B. subtilis* mutant strain D-2511 cultured in 3 ml. of the above aqueous culture medium in a test tube at 30° C. for 20 hours in shaking culture.

*B. subtilis* D-2511 was induced from *B. subtilis* K strain IAM 1523 (IAM; Institute of Applied Microbiology of Tokyo University) by irradiation with X-rays (1,000 γ/minute) for 144 minutes.

Fermentation was carried out at 30° C. for 64 hours under shaking. The fermented medium then contained 2.7 grams AICAR per liter. Two liters of the combined media were mixed with 10 grams of hyfrosupercel by stirring for 5 minutes, and then filtered. The filtrate obtained was made slightly acidic, and passed through a column of 60 grams of activated granular charcoal. Impurities were removed from the column by washing with water, and the AICAR was eluted with an ethanol-ammonium hydroxide-water mixture in the volume proportions of 1:1:2. The eluate was concentrated to an oil in vacuo. The oil was dissolved in 500 ml. of water, and the pH of this solution was adjusted to 10-11 by addition of ammonia in aqueous solution, and passed through a column of Dowex-1 in the formate form (8 percent cross-linkage). The AICAR was washed through the column with water. The solution was concentrated to an oil in vacuo, and the resulting oil was dissolved in 1 liter of 0.01 N hydrochloric acid. The acidified solution was adsorbed in a column on Dowex-50 in the ammonium form, and the column was washed with 1 liter of 0.01 N hydrochloric acid. The AICAR was eluted with 0.1 N ammonia in aqueous solution. The ammonia was removed from the eluate by evaporation to dryness. The dried material was dissolved in a minimal amount of water by gentle heating in a water bath, and the solution was cooled to 4-6° C. Crude crystalline AICAR was obtained. The pure compound was obtained by recrystallization from water, and 0.44 grams thereof were recovered.

Example 2

An aqueous culture medium was prepared having the following composition in grams per deciliter:

| | |
|---|---|
| Starch hydrolysate (as glucose) | 7.0 |
| Potassium dihydrogen phosphate | 0.2 |
| Diammonium hydrogen phosphate | 0.4 |
| Magnesium sulfate heptahydrate | 0.04 |
| Ferrous sulfate | 0.0005 |
| Manganese sulfate | 0.0005 |
| Casein hydrolysate | 0.4 |
| Ribonucleic acid (purity—70%) | 0.3 |
| Ammonium chloride | 0.2 |
| Calcium carbonate | 2.0 |

*B. subtilis* mutant strain D-422 was cultured by the method described in Example 1. The final AICAR concentration in the medium was 2.2 grams AICAR per liter, and 0.87 gram were recovered from five liters of the medium as described in Example 1.

Example 3

*B. megaterium* mutant strain MA-336 was cultured on a medium sterilized as described in Example 1, and containing (grams per deciliter):

| | |
|---|---|
| Starch hydrolysate (as glucose) | 8.0 |
| Potassium dihydrogen phosphate | 0.3 |
| Magnesium sulfate heptahydrate | 0.04 |
| Ferrous sulfate | 0.0005 |
| Manganese sulfate | 0.0005 |
| Casein hydrolysate | 0.2 |
| Ribonucleic acid (purity—80%) | 0.1 |
| Ammonium chloride | 1.0 |
| Ammonium nitrate | 0.2 |
| Calcium carbonate | 5.0 |

After 72 hours' fermentation under shaking at 31.5° C., the medium was found to contain 8.8 grams of AICAR per liter. 11.4 grams AICAR were recovered from 2 liters of the medium as described in Example 1.

Example 4

*B. megaterium* mutant strain MA-336 was cultured on a medium sterilized as described in Example 1, and containing (grams per deciliter):

| | |
|---|---|
| Glucose | 6.0 |
| Potassium dihydrogen phosphate | 0.2 |
| Sodium dihydrogen phosphate | 0.1 |
| Magnesium sulfate heptahydrate | 0.04 |
| Ferrous sulfate | 0.0005 |
| Manganese sulfate | 0.0005 |
| Peptone | 0.2 |
| Adenine | 0.025 |
| Ammonium chloride | 0.8 |
| Ammonium nitrate | 0.3 |
| Urea | 0.3 |
| Calcium carbonate | 2.5 |

The seed culture was carried out at 34° C. for 16 hours, and main fermentation was permitted to proceed at 34° C. for 68 hours under shaking. The fermented medium then contained 6.45 grams AICAR per liter. When the several batches of medium were worked up in the manner of Example 1, 4.6 grams of AICAR were isolated from each liter of medium.

Example 5

An aqueous culture medium was prepared having the following composition in grams per liter:

| | |
|---|---|
| Glucose | 5.0 |
| Potassium dihydrogen phosphate | 0.25 |
| Magnesium sulfate heptahydrate | 0.04 |
| Ferrous sulfate | 0.0005 |
| Manganese sulfate | 0.0005 |
| Dry yeast | 1.0 |
| Peptone | 0.5 |
| Ammonium sulfate | 0.1 |
| Ammonium nitrate | 0.5 |
| Urea | 0.5 |
| Calcium carbonate | 2.5 |

The medium was sterilized as described in Example 1.

*B. megaterium* mutant strain MA-658 cultured at 31.5° C. for 18 hours was used as the inoculum. The fermentation was carried out at 31.5° C. for 80 hours, and the medium finally contained 9.12 grams AICAR per liter. 5.8 grams AICAR were recovered from 1 liter of the medium as described in Example 1.

Example 6

*B. megaterium* mutant strain MA-658 was cultured by the method described in Example 1, but the seed culture was held at 25° C. for 20 hours and the main fermentation was carried out at 31.5° C. for 72 hours. The medium used was as following (grams per deciliter):

| | |
|---|---|
| Glucose | 6.0 |
| Potassium dihydrogen phosphate | 0.3 |
| Magnesium sulfate heptahydrate | 0.04 |
| Ferrous sulfate | 0.0005 |
| Manganese sulfate | 0.0005 |
| Inosine | 0.05 |
| Casein hydrolysate | 0.2 |
| Ammonium chloride | 1.0 |
| Ammonium nitrate | 0.3 |
| Urea | 0.3 |
| Calcium carbonate | 2.0 |

The fermented medium contained 6.3 grams AICAR per liter, 5.4 grams AICAR were recovered from 1 liter of the medium as described in Example 1.

While the invention has been described with particular reference to specific embodiments, it is to be understood that it is not limited thereto, but is to be construed broadly and restricted solely by the scope of the appended claims.

What is claimed is:

1. A method of producing 5-amino-4-imidazolecarboxamide riboside (AICAR), which comprises aerobically culturing a mutant strain of a Bacillus selected from the group consisting of *Bacillus subtilis* and *Bacillus megaterium* in an aqueous culture medium including a source of assimilable carbon, a source of assimilable nitrogen, a source of at least one purine base, and inorganic salts at a temperature substantially between 25° C. and 40° C. and at a pH value of said medium between 5.0 and 8.0 until AICAR is accumulated in said medium, said mutant strain being characterized by inability to grow on a Gray-Tatum medium in the absence of said source of a purine base, and by the ability of growing on said aqueous medium in the presence of said source of a purine base, said purine base being a member of the group consisting of adenine, guanine, hypoxanthine, and xanthine.

2. A method as set forth in claim 1, wherein said mutant is *Bacillus megaterium* ATCC 15, 118.

3. A method according to claim 1, wherein said carbon source is selected from the group consisting of glucose, fructose, maltose, sucrose, molasses, starch, and starch hydrolysate.

4. A method according to claim 1, wherein said inorganic salts in said aqueous medium yield ions of at least one member of the group consisting of sodium, potassium, magnesium, manganese, iron, calcium, phosphate, sulfate, chloride, and carbonate.

5. A method as set forth in claim 1, wherein said mutant strain is *Bacillus subtilis* ATCC 15, 115.

6. A method as set forth in claim 1, wherein said mutuant strain is *Bacillus subtilis* ATCC 15, 116.

7. A method as set forth in claim 1, wherein said mutant strain is *Bacillus megaterium* ATCC 15, 117.

8. A method as set forth in claim 1, wherein said mutant strain is *Bacillus megaterium* ATCC 15, 118.

References Cited by the Examiner

Arch. Biochem., vol. 29 (1959), pp. 222 and 223.

Greenberg, J. Am. Chem. Soc., vol. 74 (1952), pp. 6307 and 6308.

Gots et al., J. Biol. Chem., vol. 210 (1954), pp. 395 to 405.

A. LOUIS MONACELL, *Primary Examiner*.

A. E. TANENHOLTZ, *Assistant Examiner*.